(12) United States Patent  
Mordasini et al.

(10) Patent No.: US 10,632,353 B2  
(45) Date of Patent: Apr. 28, 2020

(54) METHOD FOR FORMING A FIBER-REINFORCED COMPOSITE STRUCTURE

(71) Applicant: North Thin Ply Technology Sarl, Penthalaz-Cossonay (CH)

(72) Inventors: Francois Mordasini, Penthalaz-Cossonay (CH); Gerard Gautier, Penthalaz-Cossonay (CH); Wayne Smith, Penthalaz-Cossonay (CH)

(73) Assignee: North Thin Ply Technology Sarl, Penthalaz-Cossonay (CH)

( * ) Notice: Subject to any disclaimer, the term of this patent is extended or adjusted under 35 U.S.C. 154(b) by 227 days.

(21) Appl. No.: 15/559,673

(22) PCT Filed: Mar. 18, 2016

(86) PCT No.: PCT/EP2016/056063  
§ 371 (c)(1),  
(2) Date: Sep. 19, 2017

(87) PCT Pub. No.: WO2016/150883  
PCT Pub. Date: Sep. 29, 2016

(65) Prior Publication Data  
US 2018/0161647 A1 Jun. 14, 2018

Related U.S. Application Data

(63) Continuation of application No. 15/073,907, filed on Mar. 18, 2016, now Pat. No. 10,272,302.

(30) Foreign Application Priority Data

Mar. 20, 2015 (EP) .................................. 15160141

(51) Int. Cl.  
*A63B 53/10* (2015.01)  
*B29C 53/60* (2006.01)  
(Continued)

(52) U.S. Cl.  
CPC .............. *A63B 53/10* (2013.01); *B29C 53/60* (2013.01); *B29C 70/326* (2013.01); *B29C 53/845* (2013.01)

(58) Field of Classification Search  
None  
See application file for complete search history.

(56) References Cited

U.S. PATENT DOCUMENTS 2,854,031 A * 9/1958 Donaldson ............ B29C 53/562  
                                                      138/144  
3,700,519 A    10/1972 Carter  
(Continued)

FOREIGN PATENT DOCUMENTS

| GB | 1446444 A | 8/1976 |
|---|---|---|
| WO | 9958208 A1 | 11/1999 |
| WO | 2008076992 A2 | 6/2008 |

OTHER PUBLICATIONS

Office Action in Chinese Patent Application No. 201680025004.2 dated Mar. 5, 2019, with English translation.  
(Continued)

*Primary Examiner* — Jeffry H Aftergut  
(74) *Attorney, Agent, or Firm* — Polsinelli, PC

(57) ABSTRACT

Method of forming a fiber-reinforced composite by applying multiple layers of prepreg material at the same time such that the proportion of unidirectional fibers which are orientated in the performing direction are greater than the proportion of unidirectional fibers which are obliquely orientated relative to said performing direction. This method controls the presence of overlaps, non-overlaps or gaps between the  
(Continued)

adjacent turns of the winding, thus improving the quality of the tube. This method also permits a reduction of the manufacturing costs. This method further enables production of tubes in a continuous way with different mandrels arranged to follow each other in a sequence which lead to an improvement of the production rate.

26 Claims, 11 Drawing Sheets

(51) Int. Cl.
    *B29C 70/32*     (2006.01)
    *B29C 53/84*     (2006.01)

(56) References Cited

U.S. PATENT DOCUMENTS

| | | | |
|---|---|---|---|
| 3,810,803 A | | 5/1974 | Karp |
| 4,000,896 A | | 1/1977 | Lauraitis |
| 4,010,054 A | | 3/1977 | Bradt |
| 4,082,277 A | | 4/1978 | Van Auken |
| 4,135,035 A | | 1/1979 | Branen et al. |
| 4,557,788 A | * | 12/1985 | Dana ............... B29C 53/588 156/425 |
| 4,725,060 A | | 2/1988 | Iwanaga |
| 4,734,146 A | * | 3/1988 | Halcomb ............... B29C 69/003 156/148 |
| 5,086,983 A | * | 2/1992 | Darrieux ............... B65H 81/04 242/434.5 |
| 5,101,556 A | | 4/1992 | Fluga et al. |
| 5,231,783 A | * | 8/1993 | Utsuno ............... A01K 87/00 156/184 |
| 5,256,230 A | | 10/1993 | Winkel |
| 5,427,373 A | | 6/1995 | Kusumoto |
| 6,106,413 A | | 8/2000 | Kusumoto |
| 8,328,666 B2 | | 12/2012 | Hsu |
| 9,862,135 B2 | * | 1/2018 | Kremers ............... B29C 53/70 |

OTHER PUBLICATIONS

Int'l. Search Report and Written Opinion dated Jun. 15, 2016 in priority application PCT/EP2016/056063.
Extended Search Report dated Aug. 20, 2015 in priority application EP 15160141.6.
Int'l. Search Report and Written Opinion dated Jun. 17, 2016 in corresponding Int'l. Application No. PCT/EP2016/056053.
Int'l. Preliminary Report on Patentability dated Sep. 26, 2017 corresponding Int'l. Application No. PCT/EP2016/056063.
Notice of Intention to Grant in corresponding EP application 15160141.6 dated Sep. 12, 2019.

* cited by examiner

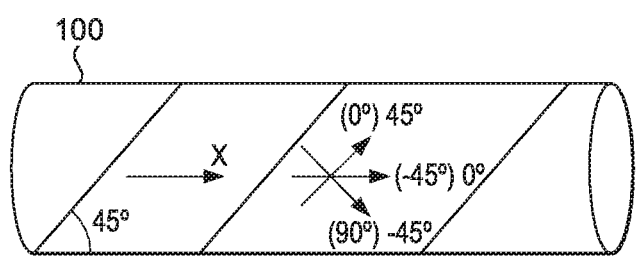
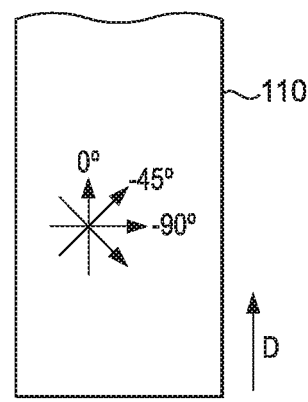
FIG. 6a    FIG. 6b
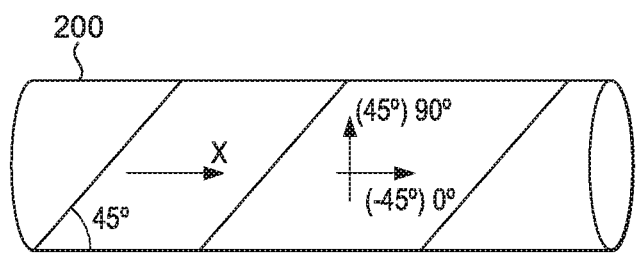
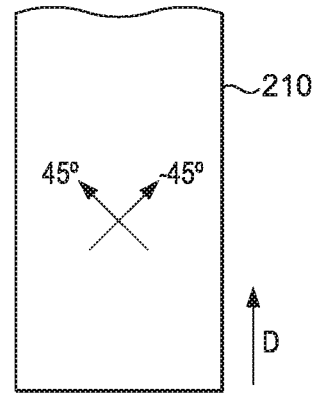
FIG. 7a    FIG. 7b

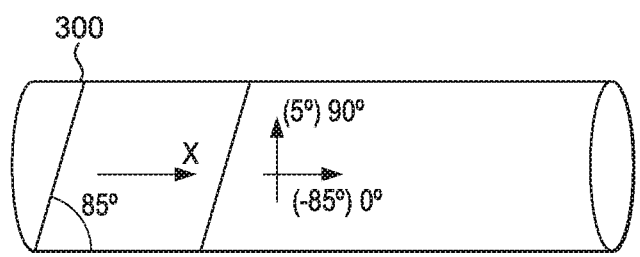
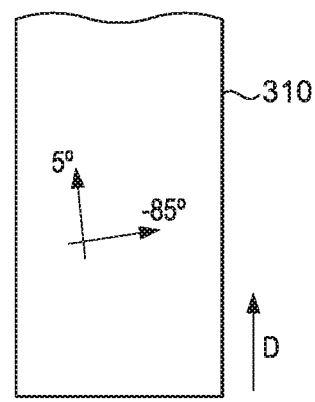
FIG. 8a          FIG. 8b
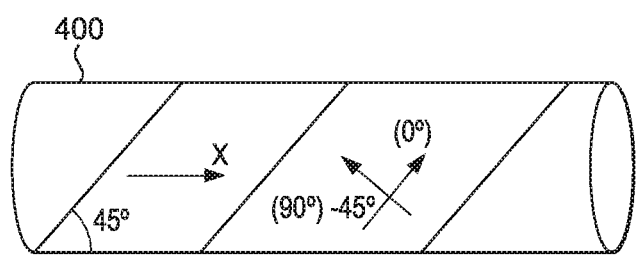
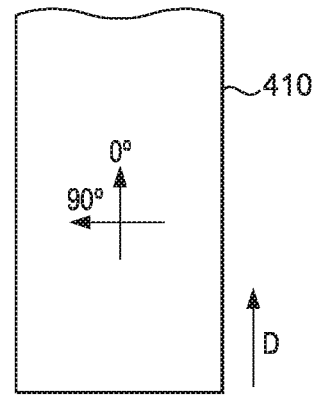
FIG. 9a          FIG. 9b

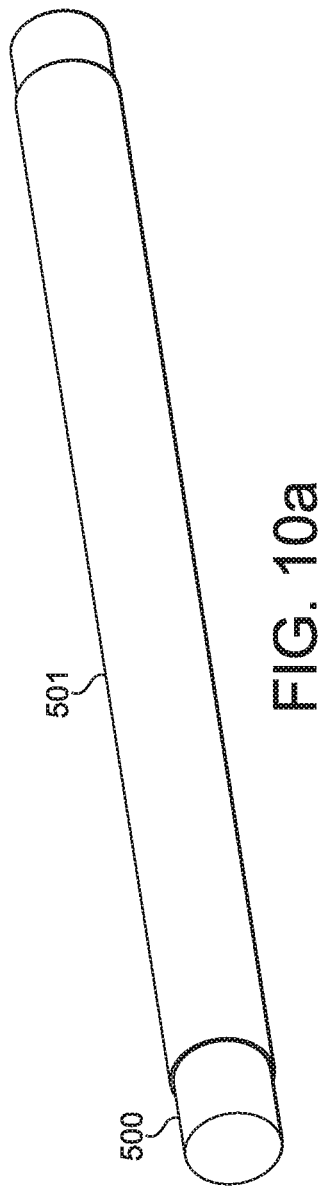
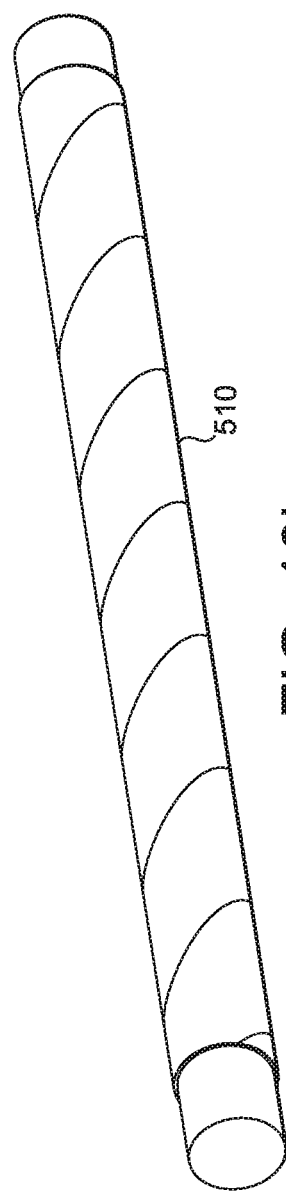
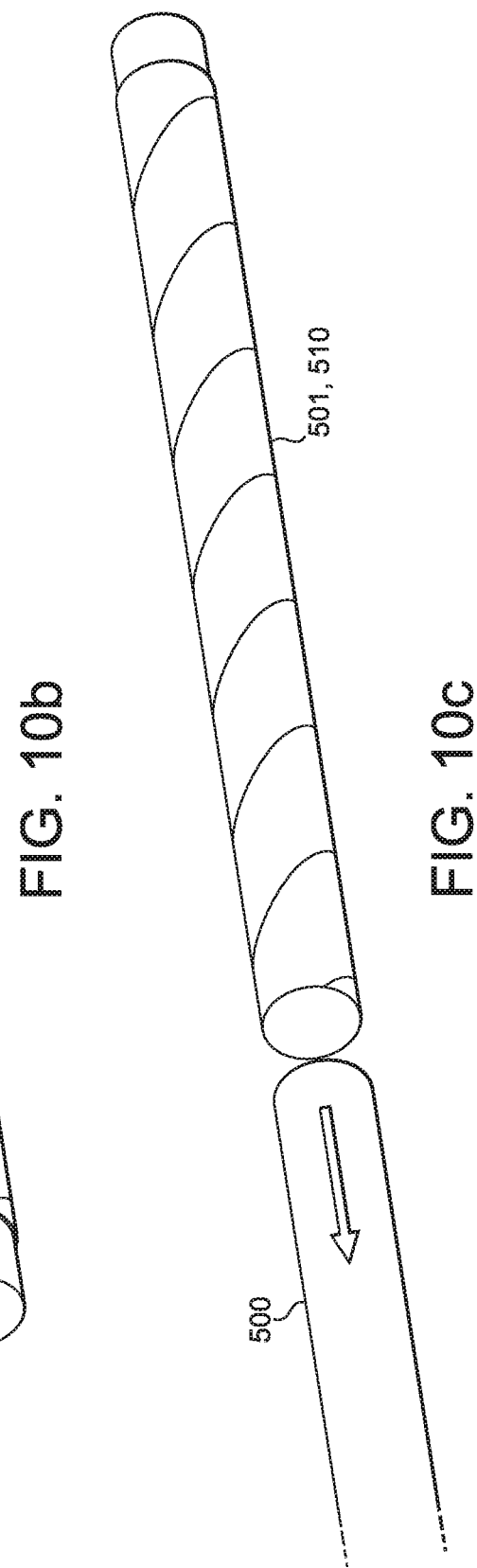
FIG. 10a
FIG. 10b
FIG. 10c

METHOD FOR FORMING A FIBER-REINFORCED COMPOSITE STRUCTURE

RELATED APPLICATIONS

This application is a 371 of PCT/EP2016/056063, filed Mar. 18, 2016, which claims priority to EP 15160141.6, filed Mar. 20, 2015, and this application claims priority to and is a continuation of U.S. Ser. No. 15/073,907, filed Mar. 18, 2016, the subject matter of which is hereby incorporated by reference in its entirety.

FIELD OF THE INVENTION

The present invention relates to a method for forming a fiber-reinforced composite structure, such as a composite tube or the like.

BACKGROUND

Generally, a composite tube is produced by a method in which prepreg material is wound in a superposed manner around a metallic mandrel, then pressure is applied with a compacting system on this composite structure, then the thermoset and/or thermoplastic resin matrix is consolidated, and then the mandrel is removed from the product. Prepreg material is widely used in the manufacture of composite parts and structures. Prepreg material is a combination of thermoset and/or thermoplastic resin matrix and fiber reinforcement. The fibers of prepreg material are continuous fibers that extend parallel to each other. Preform is created by stacking individual layers of unidirectional tape optionally with different types of fiber, different resin matrix and/or different ply weight so that the layers of the preform contain fibers extending in different directions.

To improve the performance of the composite tube when submitted to loading specific to its use, the major portion of the reinforcing fibers of the preform should be oriented in order to improve the performance of the tube. However, existing manufacturing methods do not permit to achieve such a result at a high level of quality and without badly impacting on the homogeneity of the tube. In particular, such composite tubes are generally made by a roll wrapping process. Roll wrapping consists of wrapping preforms or individual layers of prepreg material having the same length as the tube and a width corresponding to a certain number of revolutions around the mandrel. Thus, the beginning and end of each wrapped preform or layer results in a defect in the tube. Furthermore, this roll wrapping process may require several steps to achieve the total required thickness and the quality of the tube depends on the skill and experience of the operator.

The aim of the present invention is therefore to provide a method for forming a fiber-reinforced composite structure, wherein the above mentioned drawbacks are avoided.

SUMMARY OF THE INVENTION

The present invention relates to a method for forming a fiber-reinforced composite structure, such as a composite tube, comprising the steps of:

a) providing at least one preform comprising at least one first ply and at least one subsequent ply wherein each of said plies comprises a thermoset and/or thermoplastic resin matrix and fibers and wherein the direction of the fibers in said first ply is different from the direction of the fibers in said subsequent plies;

b) helically winding said preform around a mandrel from a first end region of the mandrel to a second end region of the mandrel and/or from said second end region to said first end region, such that the direction of the fibers in said first ply is orientated relative to an axial direction defined by the mandrel so as to improve a certain performance;

c) as an alternative to step b), helically winding at least two preforms around the mandrel from said first end region of the mandrel to said second end region of the mandrel, one of said preforms being wound clockwise and the other of said preforms being wound counterclockwise, such that the direction of the fibers in a ply of at least one of said preforms is orientated relative to the axial direction defined by the mandrel so as to improve a certain performance;

d) repeating steps b) or c) until the successive windings of the preform define a specific three-dimensional structure;

e) compacting with pressure said specific three-dimensional structure;

f) consolidating said specific three-dimensional structure through the application of heat cycle as required by the resin systems.

In one embodiment, step e) consists in providing pressure with a compacting system (11) on said specific three-dimensional structure.

In one embodiment, the preform (10) is composed of at least one ply of unidirectional fiber.

In one embodiment, the preform (10) is wound in such a manner that each turn of said preform (10) around the mandrel (20) is at least partially covered and/or is spaced by another turn of the same.

In one embodiment, the preform (10) is wound in such a manner that each turn of said preform (10) around the mandrel (20) adjoins with another adjacent turn of the same.

In one embodiment the mandrel (20) is tubular.

In one embodiment the mandrel (20) is conical.

In one embodiment, the mandrel (20) defines at least partially a portion of a torus.

In one embodiment the mandrel (20) has a non-round section.

In one embodiment the preform (10) is rectangular in shape.

In one embodiment, the preform (10) has a shape adapted to the variation of the section of the mandrel (20).

In one embodiment, the mandrel (20) moves along the axial direction (X) during step b) or step c).

In one embodiment, the mandrel (20) rotates about the axial direction (X) during step b) or step c).

In one embodiment, the mandrel (20) is motionless during step b) or step c).

In one embodiment, at least two preforms (10) are wound at the same time on the mandrel (20).

In one embodiment, the preform (110) comprises three plies, one first ply having fibers orientated at 0° relative to a longitudinal direction (D) defined by the preform (110), one second ply having fibers orientated at −45° relative to said longitudinal direction (D) and one third ply having fibers orientated at −90° relative to said longitudinal direction (D).

In one embodiment, the preform (210) comprises two plies, one first ply having fibers orientated at 45° relative to a longitudinal direction (D) defined by the preform (210)

and one second ply having fibers orientated at −45° relative to said longitudinal direction (D).

In one embodiment, the preform (310) comprises two plies, one first ply having fibers orientated at 5° relative to a longitudinal direction (D) defined by the preform (310) and one second ply having fibers orientated at −85° relative to said longitudinal direction (D).

In one embodiment, the preform (410) comprises two plies, one first ply having fibers orientated at 0° relative to a longitudinal direction (D) defined by the preform (410) and one second ply having fibers orientated at 90° relative to said longitudinal direction (D).

In one embodiment, the proportion of fibers in the structure oriented relative to the axial direction (X) defined by the mandrel is greater than the proportion of fibers obliquely orientated relative to said direction.

In one embodiment, the structure consists of a tube (100) having bending and torsion performance, wherein first fibers providing the bending performance of the tube are parallel to an axial direction defined by the tube and second fibers providing the torsion performance of the tube are orientated at 45° and −45° relative to said direction.

In one embodiment, the structure consists of a tube (200) having bending and compression performance, wherein first fibers providing the bending performance of the tube are parallel to an axial direction defined by the tube, and second fibers of the tube providing the compression performance are orientated at 90° relative to said direction.

In one embodiment, the structure consists of a tube (300) having an internal pressure performance, wherein first fibers providing the internal pressure performance of the tube are perpendicular to an axial direction defined by the tube, and second fibers of the tube are parallel to said axial direction.

In one embodiment, the structure consists of a tube (400) having a torsion performance, wherein fibers providing the torsion performance of the tube are orientated at 45° and −45° relative to an axial direction defined by the tube.

In one embodiment, in step a) a first preform is provided which comprises or consists of two plies and a second preform is provided which comprises or consists of two plies, and in steps b) to d) the first preform is helically wound around the mandrel such that fibers in a first ply of the first preform are oriented in a direction relative to the axial direction (X) and fibers in a second ply of the first preform are oriented in a helical direction around the mandrel, and the second preform is helically wound around the mandrel and over the first preform such that fibers in a first ply of the second preform are oriented in a direction relative to the axial direction (X) and fibers in a second ply of the second preform are oriented in a helical direction around the mandrel, thereby to form a multiple-ply tube, wherein the helically oriented fibers in the first and second preforms are oriented in opposite rotational helical directions relative to an axial direction defined by the tube.

In one embodiment, the helically oriented fibers in the first and second preforms are oriented at 45° and −45° relative to the axial direction defined by the tube.

In one embodiment the mandrel is conical and the tube is conical.

In one embodiment, the first and second preforms are wound in such a manner that each turn of the respective preform around the mandrel is at least partially covered by another turn of the same.

Thus configured, the method of the present invention permits to apply multiple layers of prepreg material at the same time such that the proportion of unidirectional fibers which are orientated in the performing direction are greater than the proportion of unidirectional fibers which are obliquely orientated relative to said performing direction. Furthermore, the method of the present invention permits to control the presence of overlaps, non-overlaps or gaps between the adjacent turns of the winding, thus improving the quality of the tube. This method also permits a reduction of the manufacturing costs.

This method further enables production of tubes in a continuous way with different mandrels arranged to follow each other in a sequence which lead to an improvement of the production rate.

Winding a preform with this method controls tension in the preform in order to obtain a better homogeneity and facilitate the improved quality of thick tubes. Finally, this method confers consistency to tube properties because it allows more control of the orientation of the fibers in the case of tapered and/or arbitrarily shaped section tubes with the adjustment of the shape of the preform and/or the applied angle of the preform after two applications of preforms on the tube.

BRIEF DESCRIPTION OF THE DRAWINGS

Other features and advantages of the present invention will appear more clearly from the detailed description of several embodiments of the invention which are illustrated by the attached drawings in which:

FIGS. 6a and 6b, illustrate a mandrel and resulting tube that can be formed by the method of the present invention;

FIGS. 7a and 7b illustrate a mandrel and resulting tube that can be formed by the method of the present invention;

FIGS. 8a and 8b illustrate a mandrel and resulting tube that can be formed by the method of the present invention;

FIGS. 9a and 9b illustrate a mandrel and resulting tube that can be formed by the method of the present invention; and FIGS. 10a, 10b, 10c and 10d illustrate several successive steps of a method according to the present invention.

DETAILED DESCRIPTION

Figure 1:
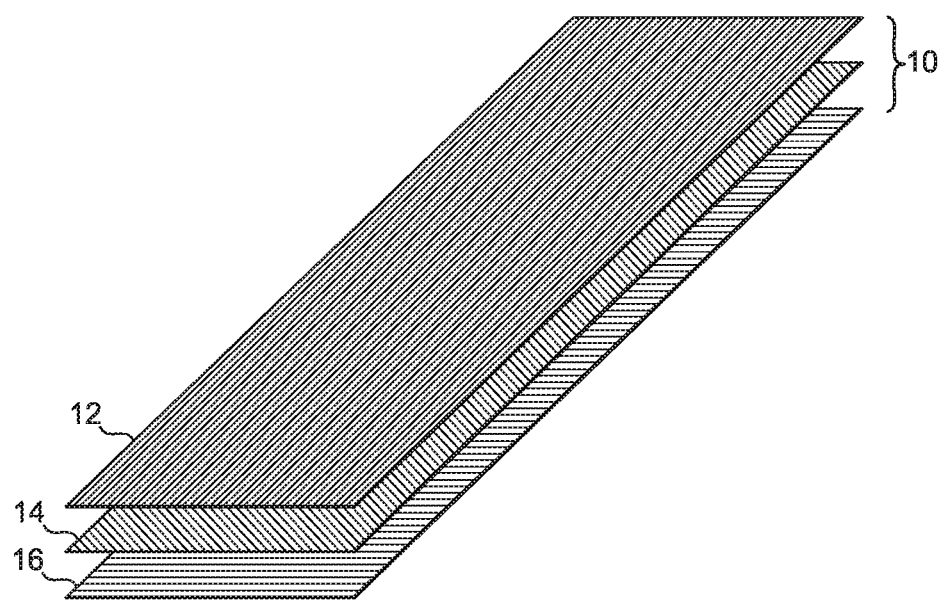
FIG. 1 is a diagrammatic representation of a preform that is suitable for use in the method of the present invention.

FIG. 1 illustrates an exemplary three-ply preform 10 suitable for use in the method of the present invention. This preform 10 comprises a first ply 12, a second ply 14 and a third ply 16, said first, second and third plies each including a thermoset and/or thermoplastic resin matrix and fibers. In the embodiment shown, the fibers in the first ply 12 are oriented in the 0° direction. The fibers in the second ply 14 are oriented in the 45° direction. The fibers in the third ply 16 are oriented in the 90° direction. Furthermore, each ply has its own ply thickness and mechanical properties. In the example, the ply thickness of the first and third plies is lower than the ply thickness of the second ply.

Figure 2A:
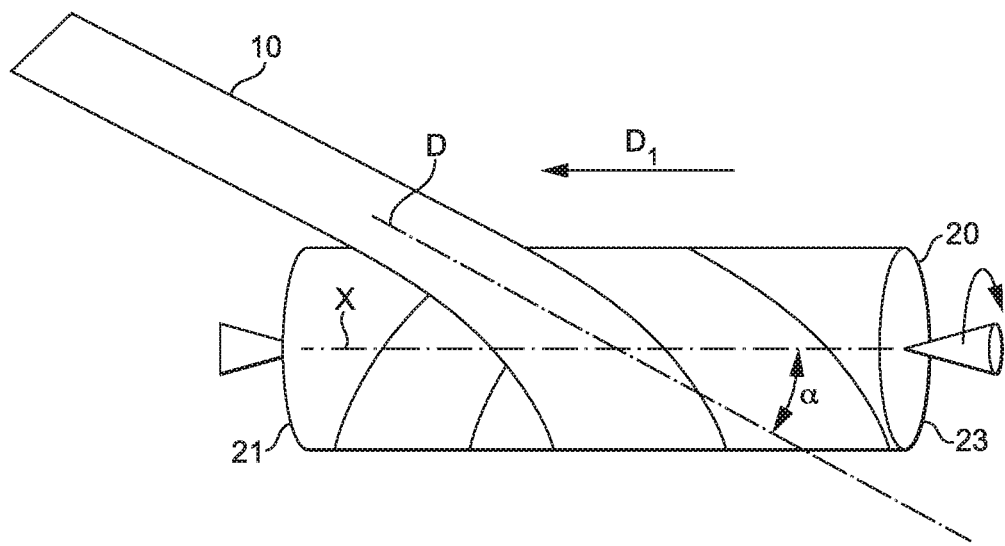
FIGS. 2a and 2b are schematic views illustrating an apparatus that is suitable for use in the method of the present invention.
Figure 2B:
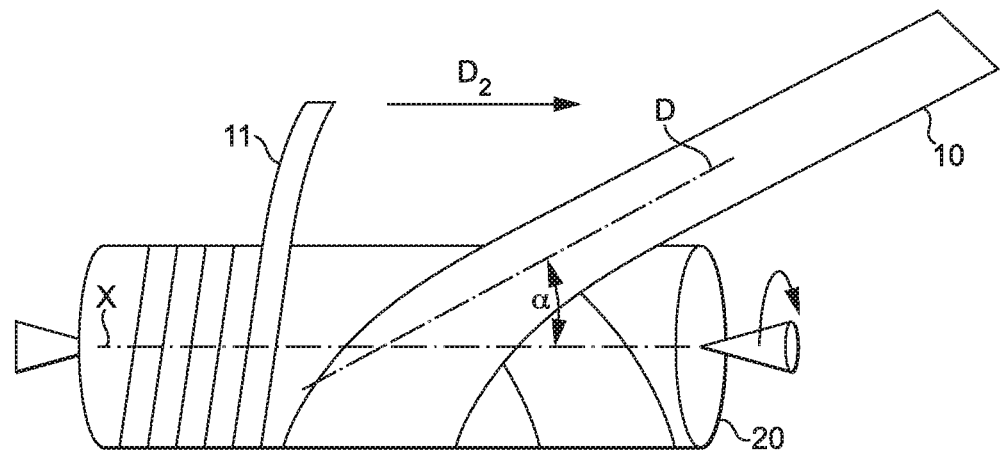

FIGS. 2a and 2b illustrate an example of the successive winding steps of the method according to one embodiment of the present invention. The preform 10 is firstly wound around a tubular mandrel 20 so that the third ply 16 is oriented towards said mandrel 20, the direction D of the first ply 12 defining an angle α, with respect to the axis of the mandrel X, which is substantially equal to −45° in the example. Thus configured, the unidirectional fibers of the second layer 14 are substantially aligned with said axial direction X. The mandrel 20 may advantageously rotate around its own axis X. The preform 10 may advantageously be wound helically around the mandrel 20. Each turn of the preform around the mandrel 20 may overlap and/or be partially covered by another turn of the same, or may adjoin with its adjacent turns, or may be separated by a gap from its adjacent turns. The preform 10 is moved in the direction D1 until it reaches approximately a left end 21 of the mandrel 20. Thereafter, the preform 10 is reversed or changed in order to have the ply 12 orientated at 45°. The preform 10 moves laterally in the opposite direction so as to permit the helical winding of the preform 10 around the mandrel 20 from its left end 21 to its right end 23. During this winding operation, the first ply 12 is applied to the mandrel 20 and the direction D of said first ply defines an angle α, with respect to the axis X of the mandrel, such that the orientation of the fibers in one ply of the preform 10 permits to improve a specific performance of the tube. In the embodiment shown, the angle α is substantially equal to +45°. Thus configured, the fibers of the second layer 14 are substantially aligned with said axial direction X, thus improving the performance of the tube when submitted to longitudinal loading. Simultaneously or afterwards, a strip of plastic imparting compacting pressure 11 is applied. Then, the structure formed by the preform 10 is consolidated with the reticulation of the resin matrix.

The method of the present invention is not limited to the above detailed embodiment. In particular, in further embodiments (not shown) of the present invention, the mandrel may be conical and/or define at least partially a portion of a torus and/or have a non-round section. Furthermore, the preform may have an alternative design. In particular, a trapezoidal or tapered preform may advantageously be used when the mandrel is conical when it is wanted to avoid an increasing overlap of the turns as the preform moves towards the end of the mandrel having the smallest diameter, which leads to an increasing wall thickness of the composite structure, or when it is wanted a tube having varying angles along its length. The number of preforms wound around the mandrel may also be greater than one. Furthermore, the number of plies of said preform may be three or more and the orientation of the fibers of said plies relative to the main direction of the preform may be any angle suitable for improving the performance of the composite structure. In any case, the parameters of the method of the present invention should be chosen so as to form a fiber-reinforced composite structure, in which the proportion of unidirectional fibers having a direction beneficial for the main performance of the composite structure is greater than the proportion of unidirectional fibers obliquely orientated relative to said direction.

Figure 3A:
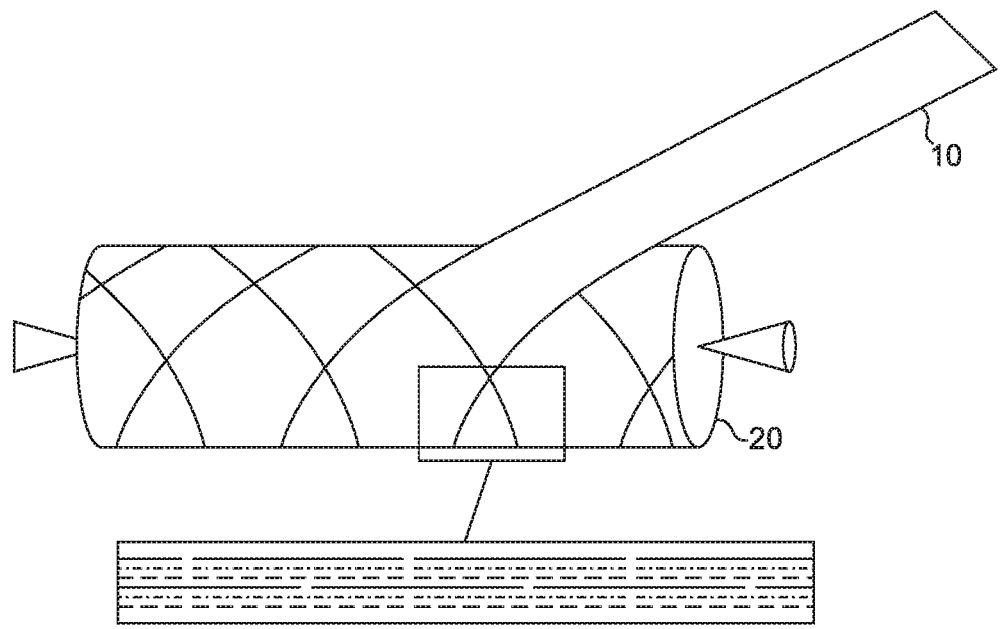
FIG. 3a is a view similar to FIG. 2b illustrating the butt joined preforms arrangement of a tube formed by the method of the present invention.

As illustrated in FIG. 3a, the preform 10 may advantageously be wound around the mandrel 20 in such a manner that each turn of the preform 10 around the mandrel 20 adjoins with another adjacent turn of the same.

Figure 3B:
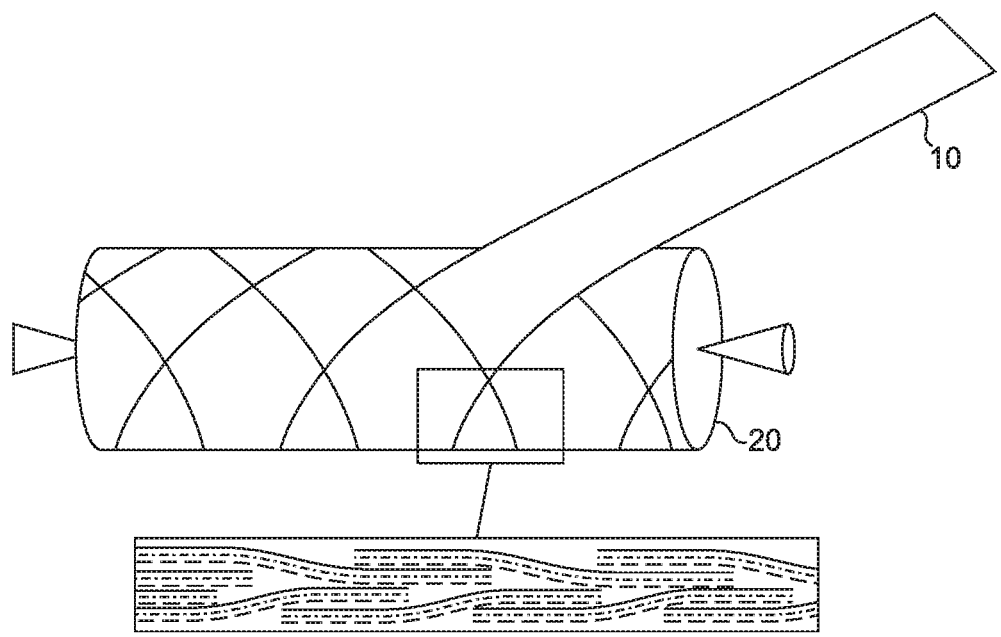
FIG. 3b is a view similar to FIG. 3a illustrating the overlapped preforms arrangement of a tube formed by the method of the present invention.
Figure 3C:
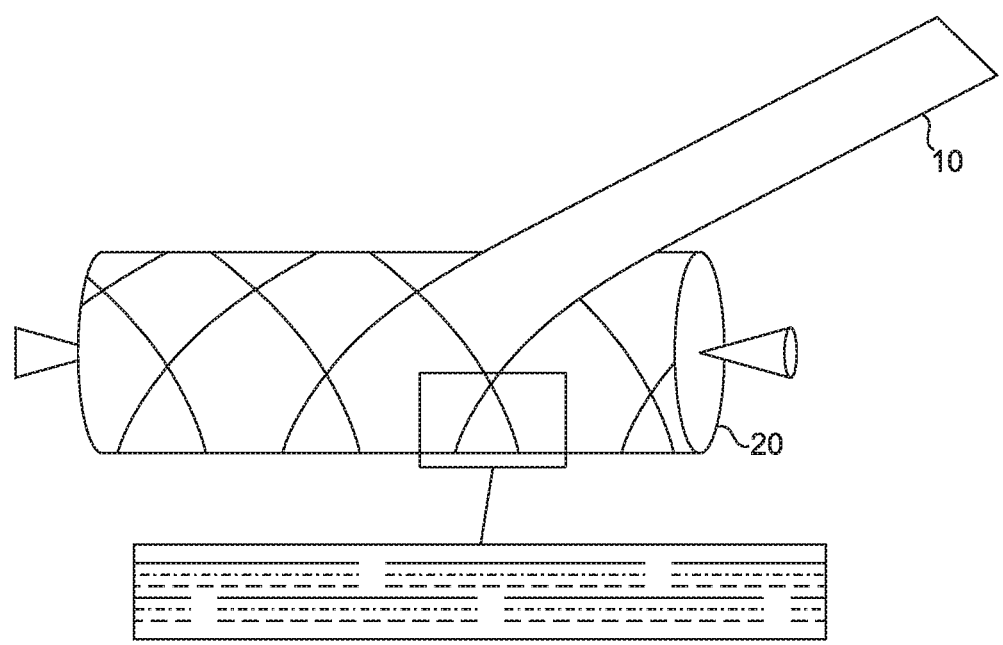
FIG. 3c is a view similar to FIG. 3a illustrating the spaced preforms arrangement of a tube formed by the method of the present invention.

Alternatively, as illustrated in FIG. 3b, the preform 10 may also be wound around the mandrel 20 in such a manner that each turn of the preform 10 around the mandrel 20 at least partially covers and/or is at least partially covered by another turn of the same. The preform 10 may also be wound around the mandrel 20 in such a manner that each turn of the preform 10 around the mandrel 20 is spaced from the other turn of the same, as illustrated in FIG. 3c.

Figure 4A:
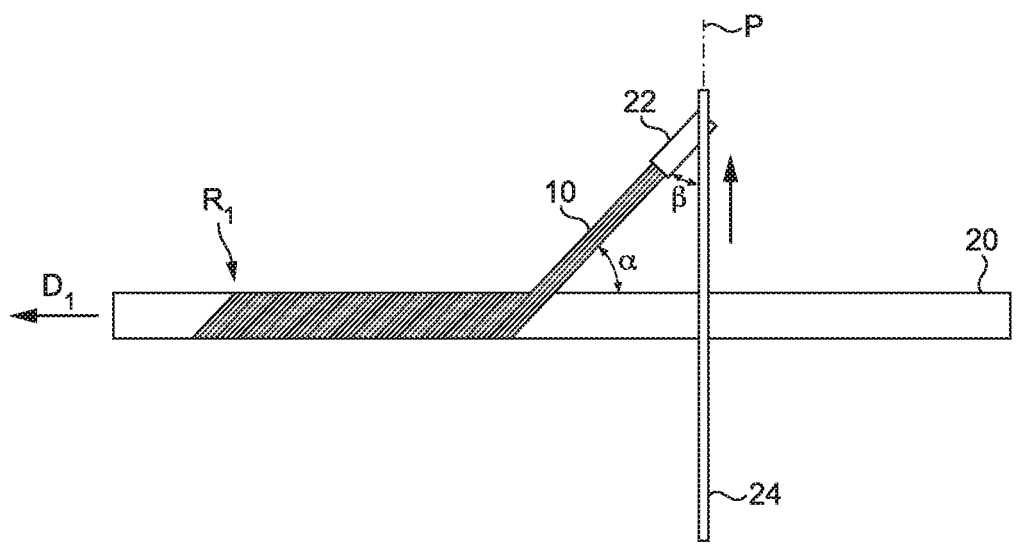
FIGS. 4a and 4b illustrate an alternative apparatus that is suitable for use in the method of the present invention.
Figure 4B:
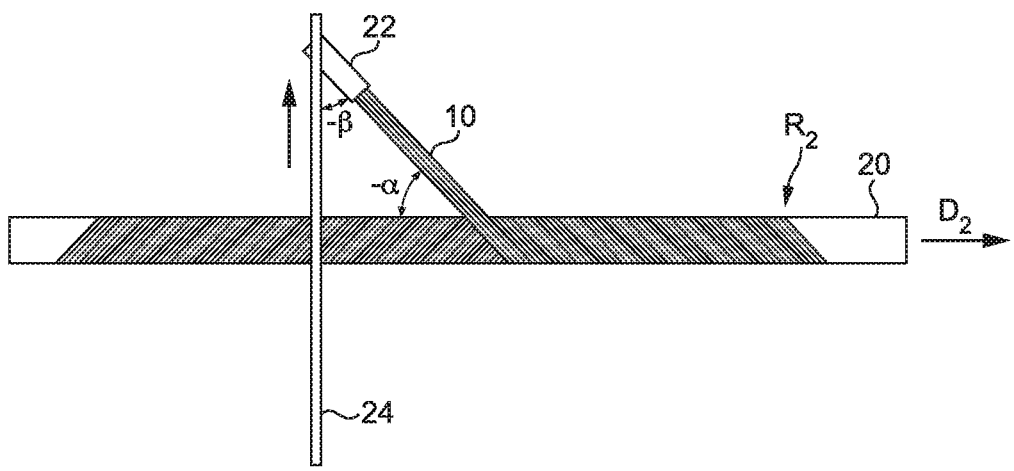

FIGS. 4a and 4b illustrate the forward and return helical winding of a preform 10 around a mandrel 20 by means of an alternative apparatus. Such an operation includes a first step consisting of displacing the mandrel 20 in the axial direction D1, without rotating it, and, simultaneously, clockwise rotating around said axial direction a roll 22, from which is delivered the preform 10. The roll 22 moves along a circular guide 24 that is centered on said mandrel axis, thus leading to the helical winding of the tape 10 from a left end region R1 of the mandrel 20 to a right end region R2 thereof. During this pass from left to right, the roll 22 is oriented at an angle β relative to the plane P defined by the circular guide 24 so that the helical winding is done at an angle α with respect to the direction D1. In a second step, corresponding to a pass from right to left, the orientation of the roll 22 relative to the circular guide 24 is modified so as to be at an angle −β relative to the plane P. Then, the mandrel 20 moves in the direction D2 opposite to D1 and, simultaneously, the clockwise rotation of the roll 22 is maintained. The return helical winding is thus done at an angle −α with respect to the axial direction.

Figure 5A:
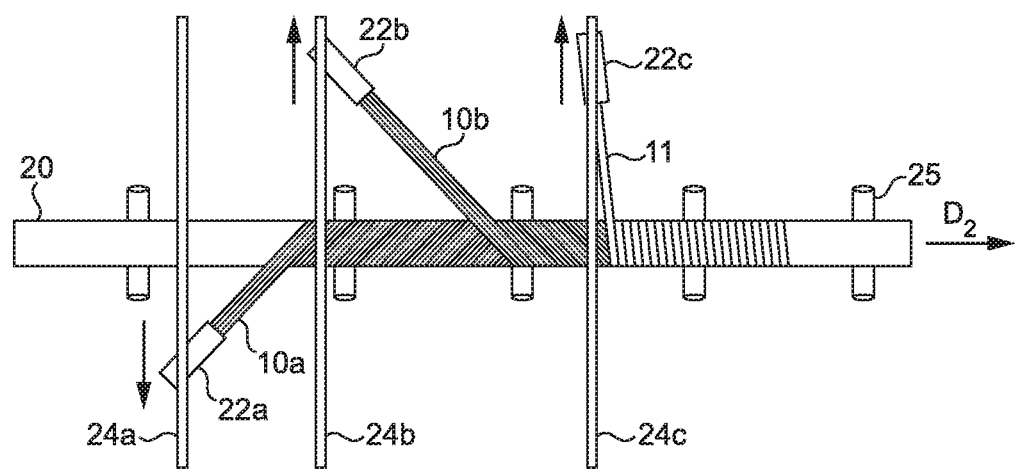
FIGS. 5a, 5b and 5c are schematic structural views illustrating another alternative apparatus that is suitable for use in the method of the present invention.
Figure 5B:
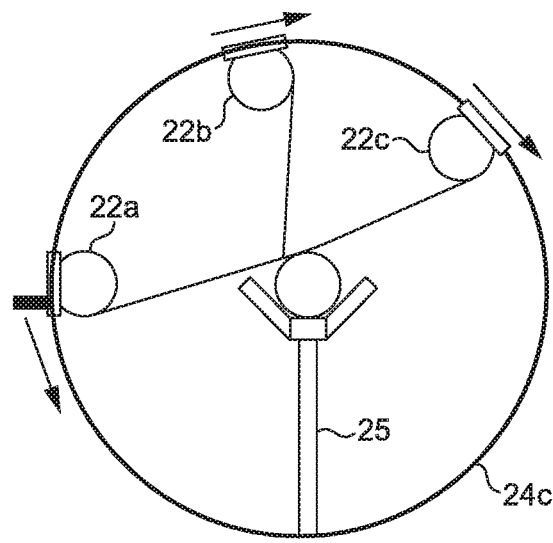
Figure 5C:
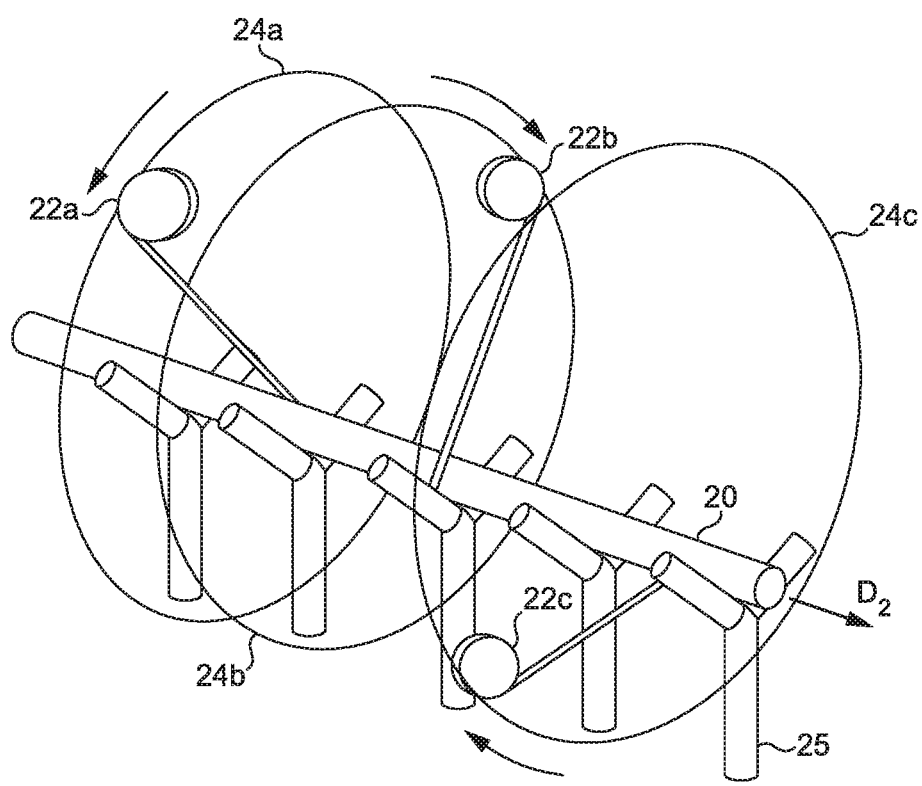

FIGS. 5a, 5b and 5c illustrate a further alternative apparatus permitting the winding operation of two preforms 10a, 10b and of a compacting tape 11 around a mandrel 20. In this example, the mandrel 20 is supported by several fork-shaped element 25 adapted to guide the mandrel during its displacement along an axial direction D2. The apparatus comprises respectively a roll 22a around which is wound the preform 10a, a roll 22b around which is wound the preform 10b and a roll 22c around which is wound the compacting tape 11, said roll 22a moving in a counterclockwise direction along a circular guide 24a, said roll 22b moving in a clockwise direction along a circular guide 24b and said roll 22c moving in a clockwise or counterclockwise direction along a circular guide 24c. Each circular guide is fixed in a position perpendicular to the axis of the mandrel. In this alternative, multiple mandrels are arranged in order to follow each other in a sequence. Mandrels are then wound continuously one after the other without a stop between the production of each part, thus increasing the production rate.

FIGS. 6a, 7a, 8a and 9a illustrate several examples of a composite tube that can be made by the method of the present invention. These examples should not be construed as limiting the scope of the invention in any way.

In the example shown in FIG. 6a, the mandrel 100 supports a plurality of windings of a preform 110 illustrated in FIG. 6b. This preform 110 comprises three plies, one first ply having fibers orientated at 0° relative to the longitudinal direction D defined by the preform 110, one second ply having fibers orientated at −45° relative to said longitudinal direction D and one third ply having fibers orientated at −90° relative to said longitudinal direction D. The preform 110 is wound on the mandrel 100 such that its longitudinal direction D is orientated at 45° relative to an axial direction X defined by the mandrel 100. Therefore, the fibers of the second ply are parallel to the axial direction X and the fibers of the first and third plies are orientated respectively at 45° and −45° relative to said axial direction X. Thus configured, the tube formed by the windings of the preform 110 has improved performance when submitted to bending and torsion loadings. The ratio between the bending performance and the torsion performance depends on the thickness and properties of each ply.

In the example shown in FIG. 7a, the mandrel 200 supports a plurality of windings of a preform 210 illustrated in FIG. 7b. This preform 210 comprises two plies, one first ply having fibers orientated at 45° relative to the longitudinal direction D defined by the preform 210 and one second ply having fibers orientated at −45° relative to said longitudinal direction D. The preform 210 is wound on the mandrel 200 such that its longitudinal direction D is orientated at 45° relative to an axial direction X defined by the mandrel 200. Therefore, the fibers of the second ply are parallel to the axial direction X and the fibers of the first ply are orientated at 90° relative to said axial direction X. Thus configured, the tube formed by the windings of the preform 210 has improved performance when submitted to bending or radial compression loadings.

In the example shown in FIG. 8a, the mandrel 300 supports a plurality of windings of a preform 310 illustrated in FIG. 8b. This preform 10 comprises two plies, one first ply having fibers orientated at 5° relative to the longitudinal direction D defined by the preform 310 and one second ply having fibers orientated at −85° relative to said longitudinal direction D. The preform 310 is wound on the mandrel 300 such that its longitudinal direction D is orientated at 85° relative to an axial direction X defined by the mandrel 300. Therefore, the fibers of the second ply are parallel to the axial direction X and the fibers of the first ply are orientated at 90° relative to said axial direction X Thus configured, the tube formed by the windings of the preform 310 has improved performance when submitted to internal pressure loadings.

In the example shown in FIG. 9a, the mandrel 400 supports a plurality of windings of a preform 410 illustrated in FIG. 9b. This preform 410 comprises two plies, one first ply having fibers orientated at 0° relative to the longitudinal direction D defined by the preform 10 and one second ply having fibers orientated at 90° relative to said longitudinal direction D. The preform 410 is wound on the mandrel 400 such that its longitudinal direction D is orientated at 45° relative to an axial direction X defined by the mandrel 400. Therefore, the fibers of the first and second plies are orientated respectively at 45° and −45° relative to said axial direction X. Thus configured, the tube formed by the windings of the preform 410 has improved performance when submitted to torsion loadings.

FIGS. 10a, 10b, 10c and 10d illustrate several successive steps of a method according to the invention when a composite tube having a toroidal shape has to be made.

The first step, shown in FIG. 10a, consists of partially covering the periphery of a mandrel 500 with a plastic or silicone bladder 501.

The second step, shown in FIG. 10b, consists of helically winding a preform 510 around said covered mandrel in accordance with the method of claim 1.

The third step, shown in FIG. 10c, consists of separation of the set formed by the preform 510 wound around the bladder 501 from the mandrel 500.

Figure 10D:
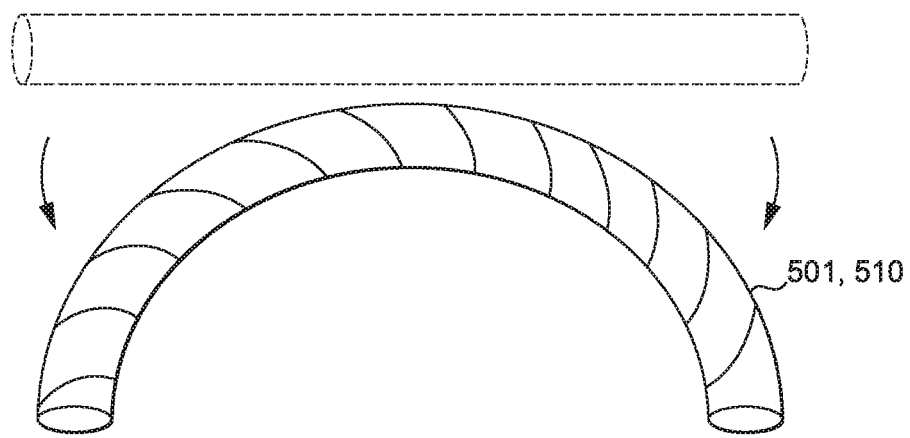

The fourth step, shown in FIG. 10d, consists of curving said bladder-preform set in order to shape it and, thereafter, position said set in a closed mold, before its consolidation.

During the consolidation, pressure is applied inside the bladder so as to press the preform against the internal walls of the mold.

Due to the helical winding of the preform around the bladder, stresses and/or folds of the preform during the curving of the preform are avoided since the various parts of the preform slide on each other.

In one preferred embodiment of the method of the present invention, in step a) a first preform is provided which comprises or consists of two plies and a second preform is provided which comprises or consists of two plies. The first preform is helically wound around the mandrel such that fibers in a first ply of the first preform are oriented in a direction relative to the axial direction (X) and fibers in a second ply of the first preform are oriented in a helical direction around the mandrel. Then the second preform is helically wound around the mandrel and over the first preform such that fibers in a first ply of the second preform are oriented in a direction relative to the axial direction (X) and fibers in a second ply of the second preform are oriented in a helical direction around the mandrel, thereby to form a multiple-ply tube. The helically oriented fibers in the first and second preforms are oriented in opposite rotational helical directions relative to an axial direction defined by the tube. Typically, the helically oriented fibers in the first and second preforms are oriented at 45° and −45° relative to the axial direction defined by the tube. Typically, the mandrel is conical and the tube is conical. Typically, the first and second preforms are wound in such a manner that each turn of the respective preform around the mandrel is at least partially covered by another turn of the same.

The invention claimed is:

1. A method for forming a fiber-reinforced composite structure comprising the steps of:
    a) providing at least one preform comprising at least one first ply and at least one subsequent ply wherein each of said plies comprises a thermoset and/or thermoplastic resin matrix and fibers and wherein the direction of the fibers in said first ply is different from the direction of the fibers in said at least one subsequent ply;
    b) helically winding said preform around a mandrel from a first end region of the mandrel to a second end region of the mandrel and/or from said second end region to said first end region, such that the direction of the fibers in the first ply is orientated relative to an axial direction (X) defined by the mandrel so as to improve a certain performance;
    c) as an alternative to step b), helically winding at least two preforms around the mandrel from said first end region of the mandrel to said second end region of the mandrel, one of said preforms being wound clockwise and the other of said preforms being wound counterclockwise, such that the direction of the fibers in the first ply of at least one of said preforms is orientated relative to the axial direction (X) defined by the mandrel so as to improve a certain performance;
    d) repeating steps b) or c) until the successive windings of the preform define a specific three-dimensional structure;
    e) compacting with pressure said specific three-dimensional structure;
    f) consolidating said specific three-dimensional structure through the application of a heating cycle as required by the resin systems,
    characterized in that:
    in step a) in the preform (10) the fibers in said first ply (14) are oriented in a direction which is inclined at an angle to the 0° direction relative to a longitudinal direction of the preform (10);

in step b) the preform (10) is helically wound such that the direction of the fibers in the first ply (14) is parallel to the axial direction (X); and in step c) the preforms (10*a*, 10*b*) are helically wound such that the direction of the fibers in each first ply (14) is parallel to the axial direction (X).

2. The method according to claim 1, wherein said step e) consists in providing pressure with a compacting system on said specific three-dimensional structure.

3. The method according to claim 1, wherein the preform is composed of at least one ply of unidirectional fiber.

4. The method according to claim 1, wherein the preform is wound in such a manner that each turn of said preform around the mandrel is at least partially covered and/or is spaced by another turn of the same.

5. The method according to claim 1, wherein the preform is wound in such a manner that each turn of said preform around the mandrel adjoins with another adjacent turn of the same.

6. The method according to claim 1, wherein the mandrel is tubular.

7. The method according to claim 1, wherein the mandrel is conical.

8. The method according to claim 1, wherein the mandrel defines at least partially a portion of a torus.

9. The method according to claim 1, wherein the mandrel has a non-round section.

10. The method according to claim 1, wherein the preform is rectangular in shape.

11. The method according to claim 1, wherein the preform has a shape adapted to the variation of the section of the mandrel (20).

12. The method according to claim 1, wherein the mandrel moves along the axial direction (X) during step b) or step c).

13. The method according to claim 1, wherein the mandrel rotates about the axial direction (X) during step b) or step c).

14. The method according to claim 1, wherein the mandrel is motionless during step b) or step c).

15. The method according to claim 1, wherein at least two preforms are wound at the same time on the mandrel.

16. The method according to claim 1, wherein the preform comprises three plies, one second ply having fibers orientated at 0° relative to a longitudinal direction (D) defined by the preform, one first ply having fibers orientated at −45° relative to said longitudinal direction (D) and one third ply having fibers orientated at −90° relative to said longitudinal direction (D).

17. The method according to claim 1, wherein the preform comprises two plies, one first ply having fibers orientated at 45° relative to a longitudinal direction (D) defined by the preform and one second ply having fibers orientated at −45° relative to said longitudinal direction (D).

18. The method according to claim 1, wherein the preform comprises two plies, one first ply having fibers orientated at 5° relative to a longitudinal direction (D) defined by the preform and one second ply having fibers orientated at −85° relative to said longitudinal direction (D).

19. The method according to claim 1, wherein the proportion of fibers in the structure oriented parallel to the axial direction (X) defined by the mandrel is greater than the proportion of fibers obliquely orientated relative to said direction.

20. The method according to claim 1, wherein the structure consists of a tube having bending and torsion performance, wherein first fibers providing the bending performance of the tube are parallel to an axial direction defined by the tube and second fibers providing the torsion performance of the tube are orientated at 45° and −45° relative to said direction.

21. The method according to claim 1, wherein the structure consists of a tube having bending and compression performance, wherein first fibers providing the bending performance of the tube are parallel to an axial direction defined by the tube, and second fibers of the tube providing the compression performance are orientated at 90° relative to said direction.

22. The method according to claim 1, wherein the structure consists of a tube having an internal pressure performance, wherein first fibers providing the internal pressure performance of the tube are perpendicular to an axial direction defined by the tube, and second fibers of the tube are parallel to said axial direction.

23. The method according to claim 1, wherein in step a) a first preform is provided which comprises or consists of two plies and a second preform is provided which comprises or consists of two plies, and in steps b) to d) the first preform is helically wound around the mandrel such that fibers in the first ply of the first preform are oriented in a parallel direction relative to the axial direction (X) and fibers in a second ply of the first preform are oriented in a helical direction around the mandrel, and the second preform is helically wound around the mandrel and over the first preform such that fibers in the first ply of the second preform are oriented in a parallel direction relative to the axial direction (X) and fibers in a second ply of the second preform are oriented in a helical direction around the mandrel, thereby to form a multiple-ply tube, wherein the helically oriented fibers in the first and second preforms are oriented in opposite rotational helical directions relative to an axial direction defined by the tube.

24. The method according to claim 23, wherein the helically oriented fibers in the first and second preforms are oriented at 45° and −45° relative to the axial direction defined by the tube.

25. The method according to claim 23, wherein the mandrel is conical and the tube is conical.

26. The method according to claim 23, wherein the first and second preforms are wound in such a manner that each turn of the respective preform around the mandrel is at least partially covered by another turn of the same.

* * * * *